United States Patent
Kim et al.

(10) Patent No.: US 10,142,061 B2
(45) Date of Patent: Nov. 27, 2018

(54) METHOD AND APPARATUS FOR TRANSMITTING SIGNAL USING SPACE TIME BLOCK CODE OR SPACE FREQUENCY BLOCK CODE IN MULTI-CARRIER SYSTEM

(71) Applicant: Samsung Electronics Co., Ltd., Gyeonggi-do (KR)

(72) Inventors: Kyeongyeon Kim, Hwaseong-si (KR); Ming Hoka, Suwon-si (KR); Chanhong Kim, Suwon-si (KR); Jiyun Seol, Seongnam-si (KR); Yeohun Yun, Hwaseong-si (KR); Yongho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/506,970

(22) PCT Filed: Aug. 26, 2016

(86) PCT No.: PCT/KR2016/009514
§ 371 (c)(1),
(2) Date: Feb. 27, 2017

(87) PCT Pub. No.: WO2017/034369
PCT Pub. Date: Mar. 2, 2017

(65) Prior Publication Data
US 2018/0167166 A1   Jun. 14, 2018

(30) Foreign Application Priority Data
Aug. 27, 2015   (KR) .................. 10-2015-0121163

(51) Int. Cl.
*H04L 1/06* (2006.01)
*H04L 27/26* (2006.01)

(52) U.S. Cl.
CPC .............. *H04L 1/0643* (2013.01); *H04L 1/06* (2013.01); *H04L 1/0606* (2013.01);
(Continued)

(58) Field of Classification Search
CPC ... H04L 1/0643; H04L 27/264; H04L 1/0606; H04L 1/0631; H04L 1/0625
See application file for complete search history.

(56) References Cited

U.S. PATENT DOCUMENTS

2008/0260001 A1* 10/2008 Betz ..................... G01S 19/02
375/140
2015/0049836 A1   2/2015 Li et al.
(Continued)

FOREIGN PATENT DOCUMENTS

KR   2016-0031440 A   3/2016

OTHER PUBLICATIONS

R. Zakaria, "On interference cancellation in Alamouti coding scheme for filter bank based multicarrier systems," The Tenth International Symposium on Wireless Communication Systems (ISWCS 2013), Oct. 15, 2013, 7 pages.
(Continued)

*Primary Examiner* — Jean B Corrielus

(57) ABSTRACT

An STBC/SFBC-based signal transmission method and apparatus is provided for use in a multi-carrier system. A method for a transmitter to transmit a signal to a receiver in a diversity transmission mode according to the present invention includes transmitting a filter index indicating a filter allocated to the receiver and transmitting Space Time Block Code (STBC) symbols to the receiver at symbol positions selected based on the filter index.

15 Claims, 9 Drawing Sheets

(52) U.S. Cl.
CPC .......... *H04L 1/0625* (2013.01); *H04L 1/0631* (2013.01); *H04L 27/264* (2013.01)

(56) References Cited

U.S. PATENT DOCUMENTS

| | | |
|---|---|---|
| 2015/0139356 A1 | 5/2015 | Song et al. |
| 2015/0146770 A1 | 5/2015 | Dore et al. |
| 2016/0080187 A1 | 3/2016 | Yun et al. |

OTHER PUBLICATIONS

Rostom Zakaria, "Intrinsic interference reduction in a filter bank-based multicarrier using QAM modulation," Physical Communication, vol. 11, Jun. 2014, 12 pages.

\* cited by examiner

METHOD AND APPARATUS FOR TRANSMITTING SIGNAL USING SPACE TIME BLOCK CODE OR SPACE FREQUENCY BLOCK CODE IN MULTI-CARRIER SYSTEM

CROSS-REFERENCE TO RELATED APPLICATION(S)

The present application claims priority under 35 U.S.C. § 365 to International Patent Application No. PCT/KR2016/009514 filed Aug. 26, 2016, entitled "METHOD AND APPARATUS FOR TRANSMITTING SIGNAL USING SPACE TIME BLOCK CODE OR SPACE FREQUENCY BLOCK CODE IN MULTI-CARRIER SYSTEM", and, through Korean Patent Application No. 10-2015-0121163 filed Aug. 27, 2015, each of which are incorporated herein by reference into the present disclosure as if fully set forth herein.

TECHNICAL FIELD

The present invention relates to a method and apparatus for transmitting signals using a Space Time Block Code (STBC) or a Space Frequency Block Code (SFBC) in a multi-carrier system.

BACKGROUND

In order to meet the increasing demand for wireless data traffic since the commercialization of 4G communication systems, the development focus is on the 5$^{th}$ Generation (5G) or pre-5G communication system. For this reason, the 5G or pre-5G communication system is called a beyond 4G network communication system or post Long Term Evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive Multiple-Input Multiple-Output (MIMO), Full Dimensional MIMO (FD-MIMO), array antenna, analog beamforming, and large scale antenna.

Also, for throughput enhancement of the 5G communication system, research is being conducted on various techniques such as small cell, advanced small cell, cloud radio access network (cloud RAN), ultra-dense network, Device to Device (D2D) Communication, wireless backhaul, moving network, cooperative communication, Coordinated Multi-Points (CoMP), and interference cancellation.

Furthermore, the ongoing research includes the use of Hybrid FSK and QAM Modulation (FQAM) and Sliding Window Superposition Coding (SWSC) as Advanced Coding Modulation (ACM), Filter Bank Multi-Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based Big data processing technology and the IoT begets Internet of Everything (IoE) technology. In order to secure the sensing technology, wired/wireless communication and network infrastructure, service interface technology, and security technology required for implementing the IoT, recent research has focused on sensor network, Machine to Machine (M2M), and Machine Type Communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and convergence of various industries.

Thus there are various attempts to apply the IoT to the 5G communication system. For example, sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

SUMMARY

Among the aforementioned technologies, the FBMC has an overlapping symbol structure and does not guarantee inter-carrier orthogonality, which make it vulnerable to Inter-Symbol Interference (ISI) and Inter-Carrier Interference (ICI), unlink legacy Orthogonal Frequency Division Multiplexing (OFDM). There is therefore a need of a method for applying STBC in consideration of the FBMC system structure.

In accordance with an aspect of the present invention, a method for a transmitter to transmit a signal to a receiver in a diversity transmission mode is provided. The method includes transmitting, to the receiver, a filter index indicating a filter allocated to the receiver and transmitting, to the receiver, Space Time Block Code (STBC) symbols to the receiver at symbol positions selected based on the filter index.

In accordance with another aspect of the present invention, a method for a receiver to receive a signal from a transmitter in a diversity transmission mode is provided. The method includes receiving, from the transmitter, a filter index indicating a filter that the transmitter allocates to the receiver and receiving, from the transmitter, STBC symbols at symbol positions selected based on the filter index.

In accordance with another aspect of the present invention, a transmitter for transmitting signals to a receiver in a diversity transmission mode is provided. The transmitter includes a transceiver, which transmits and receives signals to and from the receiver, and a control unit, which controls the transceiver to transmit, to the receiver, a filter index indicating a filter allocated to the receiver, and to transmit, to the receiver, Space Time Block Code (STBC) symbols to the receiver at symbol positions selected based on the filter index.

In accordance with still another aspect of the present invention, a receiver for receiving signals transmitted by a transmitter in a diversity transmission mode is provided. The receiver includes a transceiver, which transmits and receives signals to and from the transmitter, and a control unit, which controls the transceiver to receive, from the transmitter, a filter index indicating a filter that the transmitter allocates to the receiver, and to receive, from the transmitter, STBC symbols at symbol positions selected based on the filter index.

DETAILED DESCRIPTION

Figure 1:
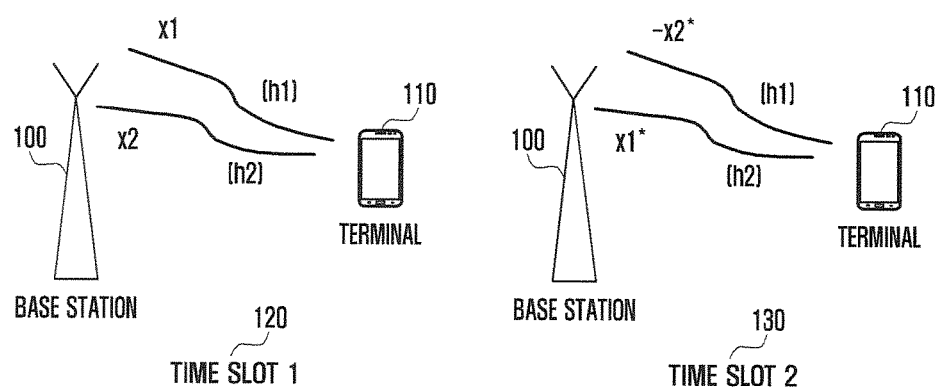
FIG. 1 is a diagram illustrating STBC-based signal communication between a transmitter and a receiver.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is directed to the FBMC-based radio communication system, it will be understood by those skilled in the art that the present invention can be applied even to other communication systems having a similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions which are executed via the processor of the computer or other programmable data processing apparatus to create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The $4^{th}$ Generation (4G) mobile communication systems such as the $3^{rd}$ Generation Partnership Project (3GPP) LTE and the Worldwide Interoperability for Microwave Access (WiMAX) have a physical layer transmission structure based on OFDM which increases frequency resource utilization efficiency with inter-carrier orthogonality to meet a user's requirements for a high data rate. However, the legacy OFDM has a drawback in requiring a guard band to protect against high power leakage. In order to overcome this drawback, research has focused on a Filter Bank Multi-Carrier (FBMC) transmission technique as a physical layer transmission scheme for the 5G mobile communication system. FBMC is capable of reducing power leakage with frequency filters, but it is disadvantageous in terms of implementation complexity and vulnerability to ISI and ICI because of inter-symbol overlap and non-existence of inter-subcarrier orthogonality.

FIG. 1 is a diagram illustrating STBC-based signal communication between a transmitter and a receiver.

In FIG. 1, the transmitter 100 (e.g., a base station) performs STBC-based signal transmission to the receiver 110 (e.g., a terminal). The transmitter 100 includes antennas capable of transmitting two signals independently, and the receiver 110 includes a single antenna. The transmitter 100 transmits symbols x1 and x2 by means of antennas 1 and 2 using subcarriers 1 and 2, respectively, during the time slot 1 120. At this time, the symbol x1 transmitted from the antenna 1 and the symbol x2 transmitted from the antenna 2 propagate through channels h1 and h2, respectively, between the transmitter 100 and the receiver 110. The transmitter 100 transmits symbols −x2* and x1* by means of antennas 1 and 2 using the subcarriers 1 and 2, respectively, during the time slot 2 130. The symbols −x2* and x1* propagate through channels h1 and h2, respectively, during the time slot 2 130.

The signals received by the receiver 110 per slot are expressed as equation (1). In equation (1), y denotes a received signal, and n denotes noise.

$$y_1 = h_1 x_1 + h_2 x_2 + n_1$$

$$y_2 = h_1(-x_2^*) + h_2 x_1^* + n_2 \quad (1)$$

The receiver 110 may perform a calculation to recover the symbols transmitted by the transmitter 100 using equation (2).

$$\hat{x}_1 = h_1^* y_1 + h_2 y_2^* = (|h_1|^2 + |h_2|^2) x_1 + h_1^* n_1 + h_2 n_2^*$$

$$\hat{x}_2 = h_2^* y_1 - h_1 y_2^* = (|h_1|^2 + |h_2|^2) x_2 + h_2^* n_1 - h_1 n_2^*. \quad (2)$$

The STBC-based transmission scheme is used as one of open-loop MIMO schemes capable of obtaining diversity gain. The legacy STBC-based transmission scheme has requirements for quasi-static channels and subcarriers to be independent from each other.

However, it is difficult to apply the legacy STBC-based transmission scheme to the FBMC system without modification because the subcarriers are not independent from each other in the FBMC system.

Figure 2:
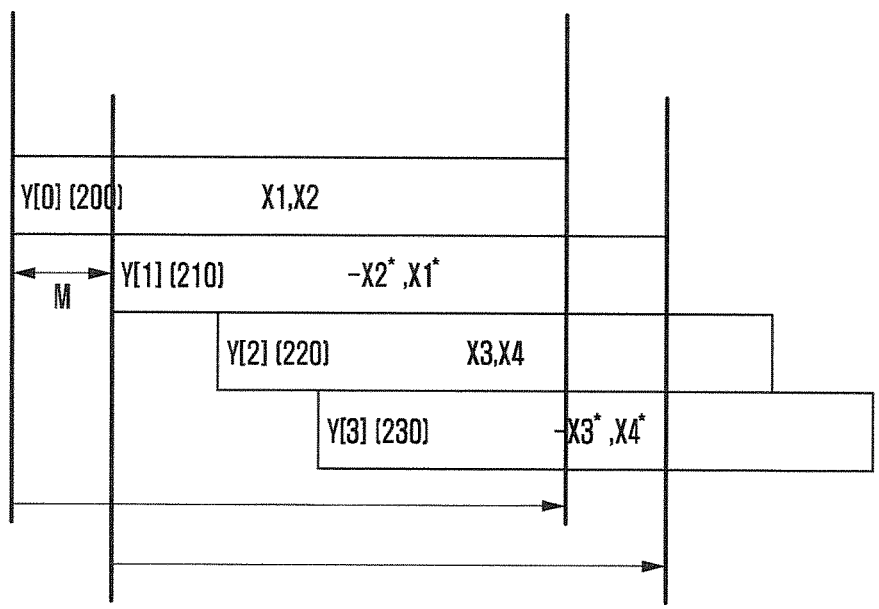
FIG. 2 is a diagram illustrating a symbol transmission mechanism in an FBMC system using an STBC-based transmission scheme according to an embodiment of the present invention.

FIG. 2 is a diagram illustrating a symbol transmission mechanism in an FBMC system using an STBC-based transmission scheme according to an embodiment of the present invention.

In the case of applying the legacy STBC transmission scheme to the FBMC system, the transmitter may transmit symbols X1 and X2 at the position of reception symbol Y[0] 200, symbols −X2* and X1* at the position of reception symbol Y[1] 210, symbols X3 and X4 at the position of reception symbol Y[2] 220, and symbols −X4* and X3* at the position of reception symbol Y[3] 230 as shown in FIG. 2.

If the symbol length is given as Lc, the channel vector is $[h^H, 0_{N+M-L_c}]^H$, and the Toeplitz matrix configured by shifting the channel vector vertically downward for block processing is expressed as $H^{(o)}$. Here, the frequency domain channel may be expressed as $H_f^{(o)}[k] = WT[k]H^{(o)}W_N^H$. The superscript denotes antennas 1 and 2, k denotes the symbol number, and W denotes the matrix for performing Fast Fourier Transform (FFT) operation. The symbol transmission matrix T[k] is expressed as equation (3).

$$T[k] = \begin{cases} \begin{bmatrix} 0 & I_{N+M+kM} \\ 0 & 0 \end{bmatrix} & \text{if } k < 0, \\ [I_N \quad 0] & \text{if } k = 0, \\ \begin{bmatrix} 0 & 0 \\ I_{N-kM} & 0 \end{bmatrix} & \text{if } k > 0. \end{cases} \quad (3)$$

Assuming that the overlapping factor L is 4, the signal y[k] received by the receiver and the complex-valued symbol s[k] transmitted by the transmitter have a relationship as shown in equation (4). Here, k denotes the symbol number, and $P_f$ denotes the frequency domain filter coefficient in the FBMC system.

$$\begin{bmatrix} y[0] \\ y^*[1] \end{bmatrix} = \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \quad (4)$$

$$\begin{bmatrix} s[0] \\ s[1] \end{bmatrix} + \begin{bmatrix} H_f^{(2)}[1]P_f & -H_f^{(1)}[1]P_f \\ H_f^{(1)*}[-1]P_f^* & H_f^{(2)*}[-1]P_f^* \end{bmatrix}$$

$$\begin{bmatrix} s[0]^* \\ s[1]^* \end{bmatrix} + \begin{bmatrix} H_f^{(1)}[2]P_f & H_f^{(2)}[2]P_f \\ H_f^{(2)*}[2]P_f^* & -H_f^{(1)*}[2]P_f^* \end{bmatrix}$$

$$\begin{bmatrix} s[2] \\ s[3] \end{bmatrix} + \begin{bmatrix} H_f^{(2)}[3]P_f & -H_f^{(1)}[3]P_f \\ H_f^{(1)*}[1]P_f^* & H_f^{(2)*}[1]P_f^* \end{bmatrix}$$

$$\begin{bmatrix} s[2]^* \\ s[3]^* \end{bmatrix} + \begin{bmatrix} H_f^{(1)}[-2]P_f & H_f^{(2)}[-2]P_f \\ H_f^{(2)*}[-2]P_f^* & -H_f^{(1)*}[-2]P_f^* \end{bmatrix}$$

$$\begin{bmatrix} s[-2] \\ s[-1] \end{bmatrix} + \begin{bmatrix} H_f^{(2)}[-1]P_f & -H_f^{(1)}[-1]P_f \\ H_f^{(1)*}[-3]P_f^* & H_f^{(2)*}[-3]P_f^* \end{bmatrix}$$

$$\begin{bmatrix} s[-2]^* \\ s[-1]^* \end{bmatrix} +$$

$$\begin{bmatrix} H_f^{(2)}[-3]P_f & H_f^{(1)}[-3]P_f \\ 0 & 0 \end{bmatrix}$$

$$\begin{bmatrix} s[-4]^* \\ s[-3]^* \end{bmatrix} +$$

$$\begin{bmatrix} 0 & 0 \\ H_f^{(1)*}[3]P^* & H_f^{(2)*}[3]P^* \end{bmatrix}$$

$$\begin{bmatrix} s[4]^* \\ s[5]^* \end{bmatrix} + n.$$

As shown in equation (4), the receiver receives the signal y[0] along with the interference caused by the symbols before and after the desired symbol.

If it is assumed that only the diagonal components of the frequency domain channel are used, the equalizer for SFBC transmission may be configured by taking only the diagonal components of the matrix $H_f^{(o)}[k]$ into consideration. At this time, w[n] and w[n+1] denote the interferences at the time indicated by the time indices n and n+1, respectively.

In the case of using the legacy LM-point equalization, the transmitted and received symbols have a relationship as shown in equation (5). Equation (5) is modeled on the wanted channel and considers the interferences as noise.

$$\begin{bmatrix} y[0] \\ y^*[1] \end{bmatrix} = \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \begin{bmatrix} s[0] \\ s[1] \end{bmatrix} + \begin{bmatrix} w[0] \\ w[1] \end{bmatrix} + n \quad (5)$$

In this case, if a Minimum Mean Square Error (MMSE) equalizer is used, the equalization matrix G is expressed as equation (6).

$$G = \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix}^H \quad (6)$$

$$\left( \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix}^H + \sigma^2 I \right)^{-1}$$

Equation (7) shows the relationship between the transmitted and received signals in which the interferences are expressed in detail in consideration of the structure of the FBMC system.

[수 7]

$$\begin{bmatrix} y[0] \\ y^*[1] \end{bmatrix} = \begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \quad (7)$$

$$\begin{bmatrix} s[0] \\ s[1] \end{bmatrix} + \begin{bmatrix} H_f^{(2)}[1]P_f & -H_f^{(1)}[1]P_f \\ H_f^{(1)*}[-1]P_f^* & H_f^{(2)*}[-1]P_f^* \end{bmatrix} \begin{bmatrix} s[0]^* \\ s[1]^* \end{bmatrix} \begin{bmatrix} w'[0] \\ w'[1] \end{bmatrix} + n.$$

A new MMSE equalizer designed in consideration of both the symbol overlap in the FBMC system and the STBC structure is expressed as equation (8).

$$\begin{bmatrix} y[0] \\ y^*[1] \\ y^*[0] \\ y[1] \end{bmatrix} = \begin{bmatrix} H_f^{(1)}[0]P_f & H_f^{(2)}[0]P_f & H_f^{(2)}[1]P_f & -H_f^{(1)}[1]P_f \\ H_f^{(2)*}[0]P_f^* & -H_f^{(1)*}[0]P_f^* & H_f^{(1)*}[-1]P_f^* & H_f^{(2)*}[-1]P_f^* \\ H_f^{(2)*}[1]P_f^* & -H_f^{(1)*}[1]P_f^* & H_f^{(1)*}[0]P_f^* & H_f^{(2)*}[0]P_f^* \\ H_f^{(1)}[-1]P_f & H_f^{(2)}[-1]P_f & H_f^{(2)}[0]P_f & -H_f^{(1)}[0]P_f \end{bmatrix} \quad (8)$$

$$\begin{bmatrix} s[0] \\ s[1] \\ s[0]^* \\ s[1]^* \end{bmatrix} \begin{bmatrix} w'[0] \\ w'[1] \\ w'^*[0] \\ w'^*[1] \end{bmatrix} + \begin{bmatrix} n \\ n^* \end{bmatrix}.$$

$$G_{wl} = \overline{H}^H (\overline{H}\overline{H}^H + \sigma^2 I)^{-1}$$

Here, $\overline{H}$ is expressed as equation (9).

$$\overline{H} = \begin{bmatrix} H_f^{(1)}[0]P_f & H_f^{(2)}[0]P_f & H_f^{(2)}[1]P_f & -H_f^{(1)}[1]P_f \\ H_f^{(2)*}[0]P_f^* & -H_f^{(1)*}[0]P_f^* & H_f^{(1)*}[-1]P_f^* & H_f^{(2)*}[-1]P_f^* \\ H_f^{(2)*}[1]P_f^* & -H_f^{(1)*}[1]P_f^* & H_f^{(1)*}[0]P_f^* & H_f^{(2)*}[0]P_f^* \\ H_f^{(1)}[-1]P_f & H_f^{(2)}[-1]P_f & H_f^{(2)}[0]P_f & -H_f^{(1)}[0]P_f \end{bmatrix} \quad (9)$$

If $\overline{H}$ is calculated without consideration of symbol overlap in the FBMC system, the northeast block matrix and the southwest block matrix become zero.

The present invention proposes $\overline{H}$ and an equalization matrix based thereon in consideration of the overlap structure in the FBMC system and thus may show superior performance.

Figure 3A:
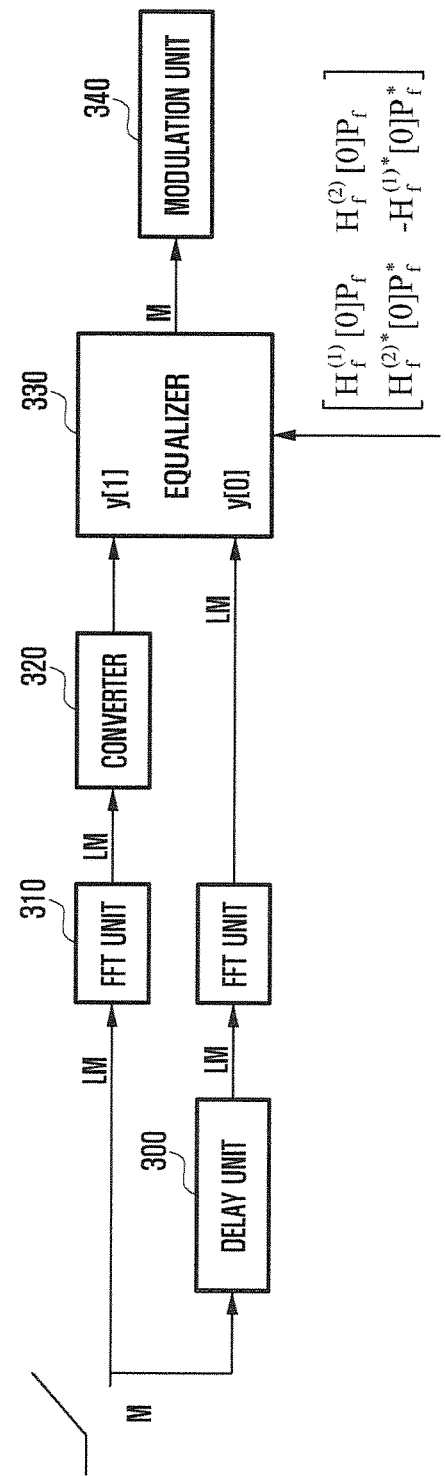
FIG. 3A is a block diagram illustrating a configuration of an equalizer to which a legacy STBC transmission scheme is applied.

FIG. 3A is a block diagram illustrating a configuration of an equalizer to which a legacy STBC transmission scheme is applied.

In reference to FIG. 3A, the received signal y[1] is FFTed by an FFT unit 310 and then converted to a complex-conjugated number by a converter 320, the complex-conjugated number being input to an equalizer 330. After being delayed as much as M by a delay unit 300, the received signal y[0] is FFTed and then converted to a complex-conjugated number so as to be input to the equalizer 330 in the same way. The equalizer 330 equalizes the inputs corresponding to y[0] and y[1] with the matrix of equation (10), and a modulation unit 340 modulates the equalized signals.

$$\begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \quad (10)$$

Figure 3B:
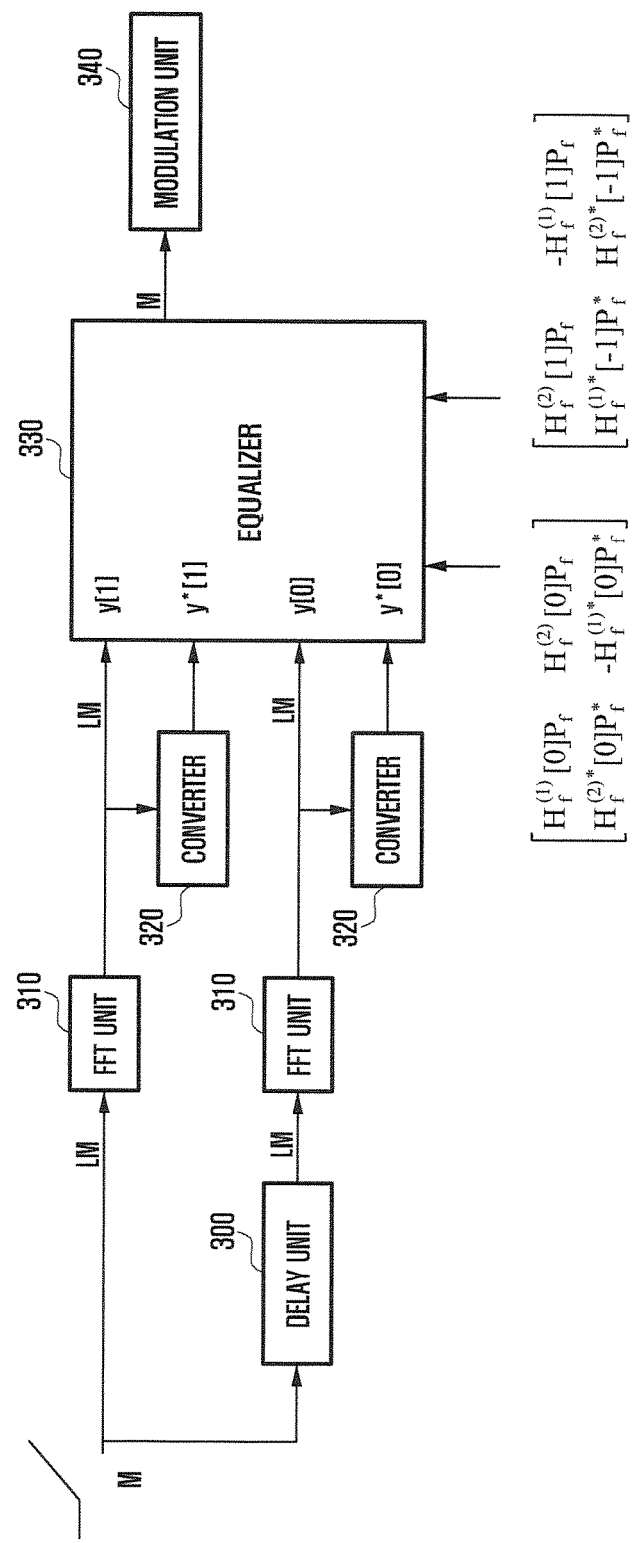
FIG. 3B is a block diagram illustrating a configuration of an equalizer to which an STBC transmission scheme proposed in the present invention is applied.

FIG. 3B is a block diagram illustrating configuration of an equalizer to which an STBC transmission scheme proposed in the present invention is applied.

In reference to FIG. 3B, the received signal y[0] is FFTed by an FFT unit 310, and the FFTed signal is input to an equalizer 330 and a converter 320, which performs conversion on the FFTed signal to generate a complex-conjugated number to the equalizer 330. After being delayed as much as M by a delay unit 300, the received signal y[1] is FFTed, and the FFTed signal is input to the equalizer 330 and the converter 320, which performs conversion on the FFTed signal to generate a complex-conjugated number to the equalizer 330. The equalizer 330 equalizes the inputs corresponding to y[0] and y[1] with the matrix of equation (11) and the inputs corresponding to y[0]* and y[1]* with a matrix of equation (12), respectively, and a modulator 340 modulates the equalized signals.

$$\begin{bmatrix} H_f^{(1)}[0]P_f & H_f^{(2)}[0]P_f \\ H_f^{(2)*}[0]P_f^* & -H_f^{(1)*}[0]P_f^* \end{bmatrix} \quad (11)$$

$$\begin{bmatrix} H_f^{(2)}[1]P_f & -H_f^{(1)}[1]P_f \\ H_f^{(1)*}[-1]P_f^* & H_f^{(2)*}[-1]P_f^* \end{bmatrix} \quad (12)$$

The present invention proposes an apparatus for supporting the STBC structure and STBC-based transmission method to apply the STBC transmission scheme to the FBMC system. The technical concept of the present invention can be applied to an SFBC-based communication system.

A description is made hereinafter of the method for selecting positions to which STBC/SFBC symbols are mapped in order for a receiver to improve channel strength in consideration of the properties of a filter for use in the FBMC system.

The transmitter and the receiver may have an interference table containing interference levels of subcarriers and symbols per filter bank in use. Tables 1 and 2 exemplify the interference table in which columns denote symbols and rows denote subcarriers. In Table 1, assuming that a desired symbol having a value of 1 is positioned at the center, the values surrounding the desired symbol indicate the levels of interference affecting the desired symbol. In Table 1, if the desired symbol (hereinafter, referred to interchangeably as reference symbol) is x[0], x[1] and x[−1] have the interference level of 0.01, and x[2] and x[−2] have the interference level of 0.1. In Table 2, if the desired symbol is x[0], x[1] and x[−1] have the interference level of 0.01, and x[2] and x[−2] have the interference level of 0.005.

TABLE 1

| 0 | 0 | 0 | 0 | 0 | 0 | 0 |
|---|---|---|---|---|---|---|
| 0 | 0 | 0 | 0.1 | 0 | 0 | 0 |
| 0.005 | 0.1 | 0.01 | 1 | 0.01 | 0.1 | 0.005 |
| 0 | 0 | 0 | 0.1 | 0 | 0 | 0 |
| 0 | 0 | 0 | 0 | 0 | 0 | 0 |

TABLE 2

| 0 | 0 | 0 | 0 | 0 | 0 | 0 |
|---|---|---|---|---|---|---|
| 0 | 0 | 0 | 0.1 | 0 | 0 | 0 |
| 0.1 | 0.005 | 0.01 | 1 | 0.01 | 0.005 | 0.1 |
| 0 | 0 | 0 | 0.1 | 0 | 0 | 0 |
| 0 | 0 | 0 | 0 | 0 | 0 | 0 |

By referencing an interference table like Table 1 and Table 2, the transmitter/receiver may select positions suitable for mapping STBC/SFBC symbols thereto.

In an embodiment, the coded symbol may be mapped to a position affected by the greatest interference. Table 3 exemplifies a case where the STBC symbols corresponding to the symbol position 0 are mapped to the positions of symbol 0 and symbol 2, which causes the greatest interference to the symbol 0 based on Table 1. In the case of symbol 1, the STBC symbols corresponding to the symbol position 1 are mapped to the positions of symbol 1 and symbol 3, which cause the greatest interference to the symbol 1.

TABLE 3

| | time | | | |
|---|---|---|---|---|
| Ant | 0 | 1 | 2 | 3 |
| Ant 0 | X1 | X3 | −X2* | −X4* |
| Ant 1 | X2 | X4 | X1* | X3* |

Table 4 shows a case where the STBC symbols corresponding to symbol position 0 are mapped to the positions of symbol 0 and symbol 3, which causes the greatest interference to the symbol 0 based on Table 2. In the case of symbol 1, the STBC symbols corresponding to the symbol position 1 are mapped to the positions of symbol 1 and symbol 4, which causes the greatest interference to the symbol 1.

TABLE 4

| | time | | | | | |
|---|---|---|---|---|---|---|
| Ant | 0 | 1 | 2 | 3 | 4 | 5 |
| Ant 0 | X1 | X3 | X5 | −X2* | −X4* | −X6* |
| Ant 1 | X2 | X4 | X6 | X1* | X3* | X5* |

Although the coded symbol may be mapped to a symbol position from which the greatest interference occurs to the reference symbol (option 1), it may also be possible to determine the coded symbol position in consideration of other factors. It may be possible to map the coded symbol to the symbol position from which the greatest interference occurs to the reference symbol among the positions at which the symbols undergo a channel equivalent to the channel of the reference symbol in consideration of both the channel and filter (option 2) or to map the coded symbol to the symbol position from which the greatest interference occurs to the reference symbol in a range determined based on the reference symbol in consideration of the delay requirement of the system or the transmitter/receiver (option 3). It may also be possible to map the coded symbol to a symbol position from which the greatest interference occurs to the reference symbol among the symbols that can be stored in a storage device in consideration of the memory requirements of the transmitter/receiver (option 4).

It may also be possible for the transmitter to notify the receiver of the mapping scheme to be used in the initialization phase. In the case that one of the options 2 to 4 is selected, the receiver may notify the transmitter of the recommended symbol position in the initial phase.

Such mapping schemes are designed to improve the data rate by maximizing the signal size of the STBC symbol by mapping the STBC symbol to the reemergence symbol position and the symbol position from which the greatest interference occurs to the reference symbol by taking notice of the FBMC system structure characterized by symbol overlap.

Figure 4:
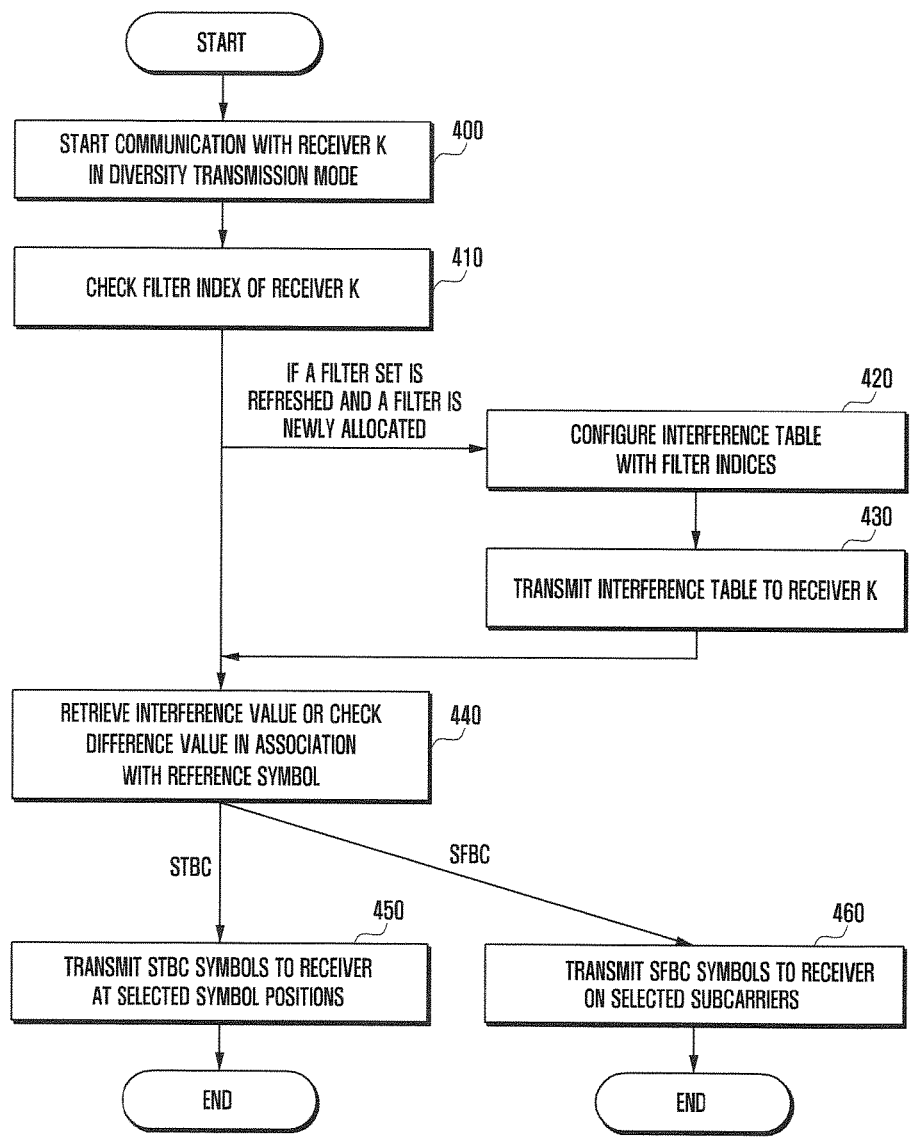
FIG. 4 is a flowchart illustrating a signal transmission procedure of a transmitter according to an embodiment of the present invention.

FIG. 4 is a flowchart illustrating a signal transmission procedure of a transmitter according to an embodiment of the present invention. In the following description, the transmitter may be a base station, and the receiver may be a terminal.

In reference to FIG. 4, the transmitter starts communication with a receiver k in a diversity transmission mode at step 400. The transmitter checks a filter index of a filter bank allocated to the receiver k at step 410. At this time, the checked filter index may be notified to the receiver k. If a filter set allocated to the receiver k is refreshed and a filter is newly allocated, at step 420 the transmitter configures items of an interference value caused by mismatch between the filter index and the symbol (time) and an interference value caused by mismatch between the filter index and the frequency (subcarrier) in the interference table. The transmitter also configures items of a difference value between the symbol (time) position from which the greatest interference occurs to the reference symbol and the reference symbol position and a difference value between the subcarrier (frequency) from which the greatest interference occurs to the reference symbol and the reference symbol position. Next, the transmitter transmits the interference table to the receiver k through a control channel or a data channel at step 430. Here, the control channel may be a Physical Downlink Control Channel (PDCCH). The transmitter retrieves at step 440 the interference level (hereinafter, referred to interchangeably as interference value) at a symbol and a subcarrier from the interference table stored with a filter index or indicated by a newly configured filter index. The transmitter checks at step 440 the difference value between the symbol-subcarrier (time-frequency) position from which the greatest interference occurs to the reference symbol and the reference symbol position. At this time, the difference value may be retrieved from the interference table which is previously stored in the transmitter or newly configured.

Next, the transmitter selects a symbol to which the STBC symbol is mapped based on the difference value between the retrieved interference value or the difference value between the reference symbol position and the symbol-subcarrier position from which the greatest interference occurs to the reference symbol, maps the STBC codeword to the position distant over a predetermined number of symbols in the time domain, and transmits the STBC codeword to the receiver k at step 450. The transmitter also selects a subcarrier to which the SFBC symbol is mapped based on the retrieved interference value, maps the STBC code to the position distant over a predetermined number of subcarriers, and transmits the SFBC symbol to the receiver k at step 460. At this time, the symbol-subcarrier positions to which the STBC symbol or SFBC symbols are mapped may be selected using one of the aforementioned options 1 to 4.

In this case, the interference table may be stored in the transmitter and the receiver and indicated by a filter index. If the filter index is known to the transmitter and the receiver, it is not necessary to perform feedforward signaling explicitly. However, if the transmitter/receiver refreshes the filter set, a new interference table may be feedforwarded or configured by the transmitter and the receiver respectively (however, since the transmitter performs symbol mapping in consideration of various conditions as well as the interference table, the symbol mapping scheme (options 1 to 4) should be shared between the transmitter and the receiver as described above). In the case that the transmitter/receiver acquires the channel condition based on a reference signal (hereinafter, referred to interchangeably as pilot signal), it may be possible to use a space time frequency block code with which the data symbol is shifted in frequency and time domains according to the channel condition. If there is more than one symbol-subcarrier position having the greatest interference value, the transmitter may select a position among them having the least delay.

Figure 5:
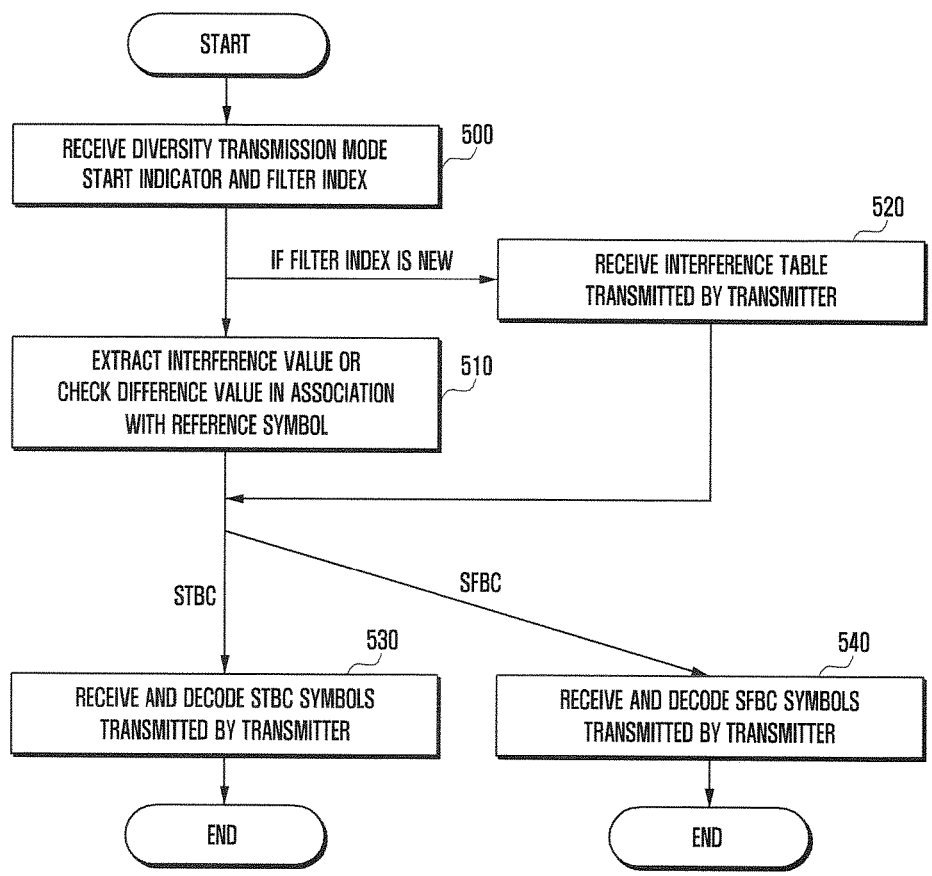
FIG. 5 is a flowchart illustrating the operation of a transmitter according to an embodiment of the present invention.

FIG. 5 is a flowchart illustrating the operation of a transmitter according to an embodiment of the present invention. In the following description, the transmitter may be a base station, and the receiver may be a terminal.

In reference to FIG. 5, the receiver receives information indicating the start of the diversity transmission mode and the filter index from the transmitter at step 500. The information indicating the start of the diversity transmission mode and the filter index may be transmitted through a PDCCH. If the interference table indicated by the filter index is not stored in the receiver, the receiver receives a new interference table (the interference table may be equivalent to that configured at step 420 of FIG. 4) transmitted by the transmitter at step 520 and may store the received interference table. If the interference table is stored in the receiver, the receiver retrieves the interference level (or interference value) associated with a predetermined symbol and a predetermined subcarrier from the interference table at step 510. The receiver also checks a difference value between a symbol-subcarrier (time-frequency) position from which the greatest interference occurs to the reference symbol and the reference symbol position, using the filter index, at step 510. Here, the difference value may be previously stored in the receiver or retrieved from the newly configured interference table received from the transmitter.

At step 530, the receiver checks the symbol position to which the STBC symbol is mapped using the retrieved interference value or the difference value between the symbol position from which the greatest interference occurs to the reference symbol and the reference symbol position, receives an STBC codeword transmitted by the transmitter in the state of being mapped to a position distant over a predetermined number of symbols in the time domain, and decodes the STBC codeword. At step 540, the receiver checks the subcarrier to which the SFBC symbol is mapped using the retrieved interference value, receives the SFBC codeword mapped to a position distant over a predetermined number of subcarriers in the frequency domain, and decodes the SFBC codeword. At this time, the STBC symbol or the SFBC symbol may be mapped to a symbol or a subcarrier based on one of the above-described options 1 to 4.

The receiver may receive the interference table from the transmitter through a control channel (particularly PDCCH) or a data channel.

Figure 6:
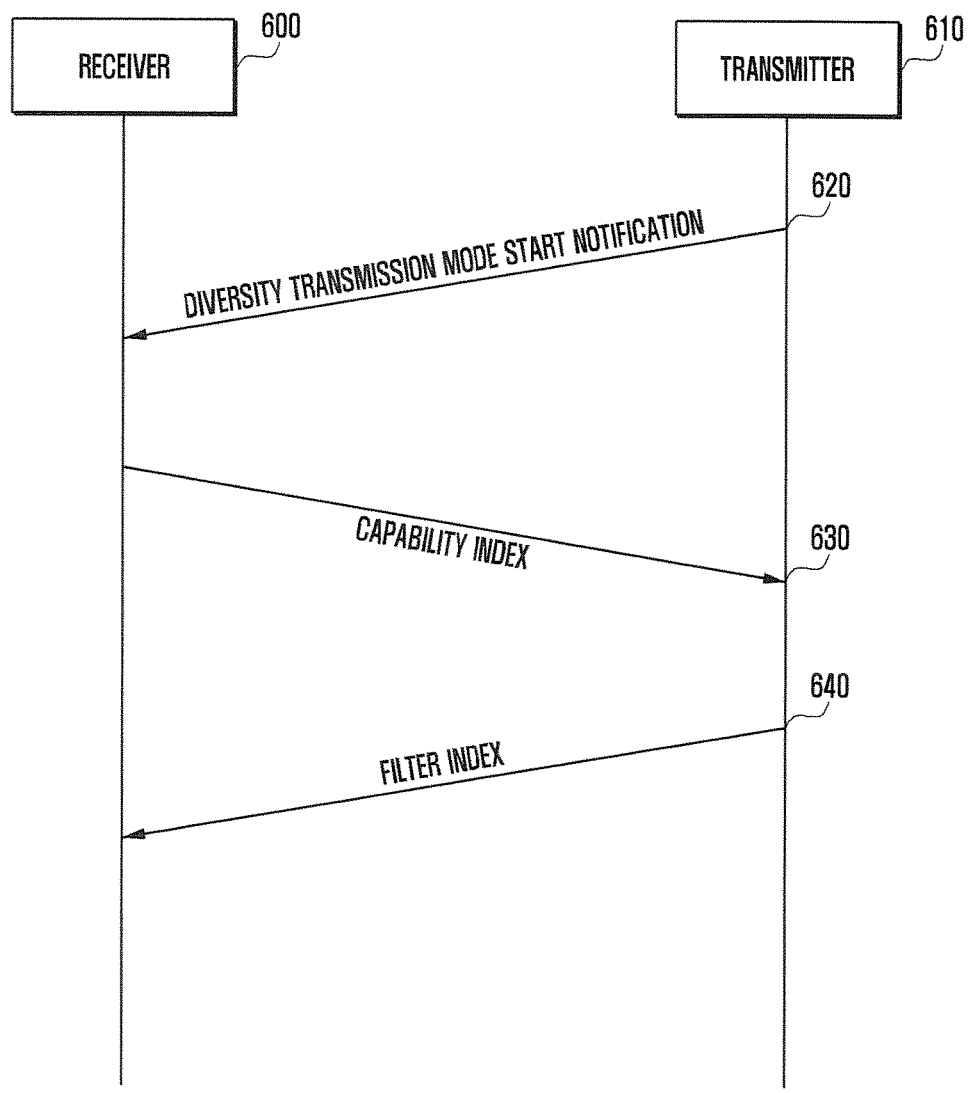
FIG. 6 is a signal flow diagram illustrating control signaling between a transmitter and a receiver during initial communication according to an embodiment of the present invention.

FIG. 6 is a signal flow diagram illustrating control signaling between a transmitter and a receiver during initial communication according to an embodiment of the present invention. The transmitter may be a base station, and the receiver may be a terminal.

In reference to FIG. 6, the transmitter 610 starts operating in a diversity transmission mode supporting STBC/SFBC transmission and notifies the receiver 600 of the start of the diversity transmission mode at step 620. If the diversity transmission mode start notification is received, the receiver transmits a capability index indicating supportable transmission modes to the transmitter at step 630. The capability index can be configured in various ways, e.g. as a 3-bit information set to 0 for indicating legacy STBC/SFBC transmission mode or 1 to 4 for indicating the above-described options 1 to 4 respectively. According to an embodiment, the capability index may be configured as a 1-bit information set to 0 for indicating legacy STBC/SFBC transmission mode or 1 for indicating the enhanced STBC/SFBC transmission modes proposed in the present invention. In this case, the transmitter/receiver may transmit/receive an indicator indicating one of the enhanced STBC/SFBC transmission modes.

If the capability index is received from the receiver, the transmitter checks the transmission mode indicated by the capability index and transmits a filter index at step 640 indicating the filter for use by the receiver. Afterward, the transmitter and the receiver communicate signals in the form of STBC/SFBC symbols according to the determined transmission mode and the interference table associated with the filter index.

Figure 7:
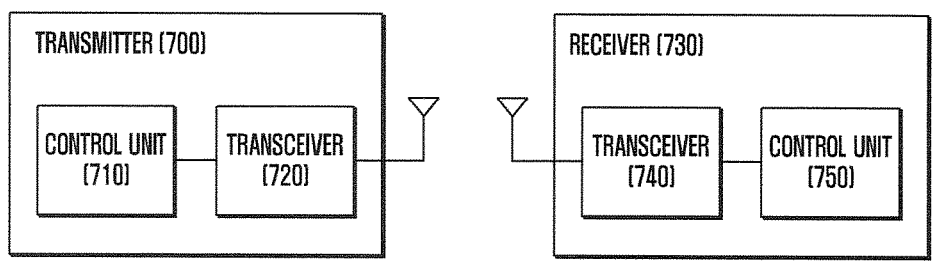
FIG. 7 is a block diagram illustrating configurations of a transmitter and a receiver according to an embodiment of the present invention.

FIG. 7 is a block diagram illustrating configurations of a transmitter and a receiver according to an embodiment of the present invention.

In reference to FIG. 7, the transmitter 700 includes a control unit 710 and a transceiver 710. The transceiver 720 may transmit a diversity transmission mode start notification and a filter index to the receiver 730 and may receive a capability indicator from the receiver 730. The transceiver 720 may also transmit STBC/SFBC symbols at symbol-subcarrier positions determined based on the filter index and capability indicator. The control unit 710 controls the transceiver 720 to operate in the diversity transmission mode and determines the symbol-subcarrier positions for transmitting the STBC/SFBC symbols based on the filter index and capability indicator according to an embodiment of the present invention.

The receiver 730 includes a control unit 750 and a transceiver 740. The transceiver 740 may receive a diversity transmission mode start notification and a filter index from the transmitter 700 and transmit a capability indicator to the transmitter 700. The transceiver 740 may also receive the STBC/SFBC symbols transmitted by the transmitter in the state of being mapped to the symbol-subcarrier positions determined based on the filter index and the capability indicator. The control unit 750 controls the operation of the transceiver 740, determines the capability indicator to be transmitted to the transmitter 700, and controls the transceiver 740 to receive the STBC/SFBC symbols transmitted by the transmitter 700 at the symbol-subcarrier positions determined based on the filter index and the capability indicator according to an embodiment of the present invention. The control unit 750 may perform in equalization and demodulation on the received STBC/SFBC symbol using equations (8) and (9).

Figure 8:
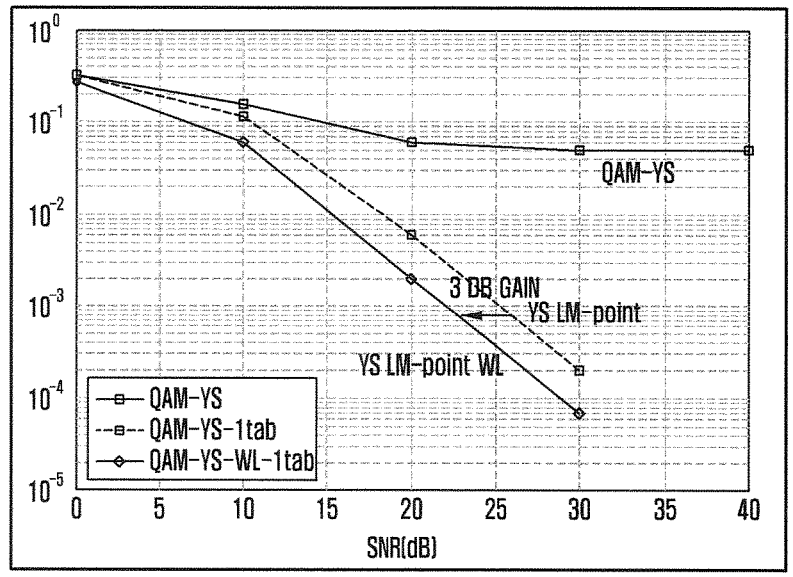
FIG. 8 is a diagram illustrating transmission performance gain graphs according to an embodiment of the present invention.
Figure 8:
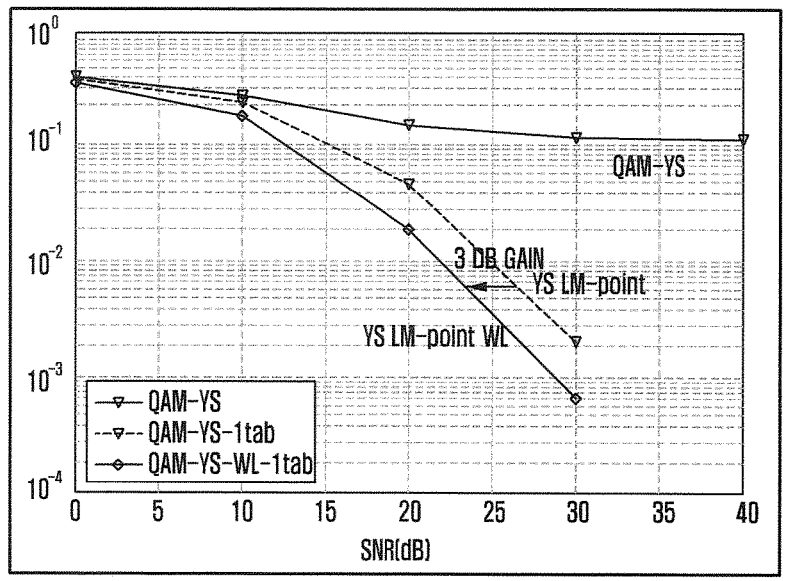

FIG. 8 is a diagram illustrating transmission performance gain graphs according to an embodiment of the present invention.

FIG. 8 shows that the STBC transmission (particularly using Alamouti code) obtains Signal-to-Noise Ratio (SNR) gain of 3 dB at the Bit Error Rate (BER) in both the cases of using the 16 Quadrature Amplitude Modulation (QAM) and 64 QAM.

As described above, the STBC/SFBC-based signal transmission method and apparatus of the present invention is advantageous in terms of transmitting signals efficiently in a multi-carrier system, such as an FBMC system which does not guarantee inter-carrier orthogonality.

It is to be appreciated that those skilled in the art can change or modify the embodiments without departing from the technical concept of this invention. Accordingly, it should be understood that the above-described embodiments are essentially for illustrative purposes only and are not in any way for restriction thereto. Thus the scope of the invention should be determined by the appended claims and their legal equivalents rather than the specification, and various alterations and modifications within the definition and scope of the claims are included in the claims.

In the above described embodiments of the present invention, the steps and message transmissions may become the targets of being selectively carried out or omitted. In each embodiment of the present invention, it is not necessary for the operations to be performed in the sequential order as depicted, and they may be performed in a changed order. Each step and message may be performed independently.

Some or all of the tables exemplified in the above-description are provided to help understand the present invention. Accordingly, the detailed description of the table is to express part of the method and apparatus proposed in the present invention. That is, it is preferable to approach the content of the table of the specification semantically rather than syntactically.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method for a transmitter to transmit a signal to a receiver in a diversity transmission mode, the method comprising:
   transmitting, to the receiver, a filter index indicating a filter allocated to the receiver; and
   transmitting, to the receiver, space time block code (STBC) symbols at symbol positions selected based on the filter index.

2. The method of claim 1, further comprising:
   transmitting, to the receiver, an indicator indicating start of the diversity transmission mode; and
   receiving, from the receiver, a capability indicator indicating transmission modes supported by the receiver.

3. The method of claim 1, wherein the symbol positions are determined based on at least one of difference values, in time and frequency domains, between a symbol position from which a greatest interference occurs to a reference symbol indicated by the filter index.

4. The method of claim 1, further comprising configuring, when no information on the filter index is stored in the transmitter, interference information in association with the filter index.

5. A method for a receiver to receive a signal from a transmitter in a diversity transmission mode, the method comprising:
   receiving, from the transmitter, a filter index indicating a filter which the transmitter allocates to the receiver; and
   receiving, from the transmitter, space time block code (STBC) symbols at symbol positions selected based on the filter index.

6. The method of claim 5, further comprising:
   receiving, from the transmitter, an indicator indicating start of the diversity transmission mode; and
   transmitting, to the transmitter, a capability indicator indicating transmission modes supported by the receiver.

7. The method of claim 5, wherein the symbol positions are determined based on at least one of difference values, in time and frequency domains, between a symbol position from which a greatest interference occurs to a reference symbol indicated by the filter index.

8. The method of claim 5, further comprising receiving, when no information on the filter index is stored in the transmitter, interference information configured in association with the filter index from the transmitter.

9. A transmitter for transmitting signals to a receiver in a diversity transmission mode, the transmitter comprising:
   a transceiver which transmits and receives signals to and from the receiver; and
   a control unit which controls the transceiver to transmit, to the receiver, a filter index indicating a filter allocated to the receiver, and to transmit, to the receiver, space time block code (STBC) symbols at symbol positions selected based on the filter index.

10. The transmitter of claim 9, wherein the control unit controls the transceiver to transmit, to the receiver, an indicator indicating start of the diversity transmission mode, and to receive, from the receiver, a capability indicator indicating transmission modes supported by the receiver.

11. The transmitter of claim 9, wherein the symbol positions are determined based on at least one of difference values, in time and frequency domains, between a symbol position from which a greatest interference occurs to a reference symbol indicated by the filter index.

12. The transmitter of claim 9, wherein the control unit configures, when no information on the filter index is stored in the transmitter, interference information in association with the filter index.

13. A receiver for receiving signals transmitted by a transmitter in a diversity transmission mode, the receiver comprising:
   a transceiver which transmits and receives signals to and from the transmitter; and
   a control unit which controls the transceiver to receive, from the transmitter, a filter index indicating a filter which the transmitter allocates to the receiver, and to receive, from the transmitter, space time block code (STBC) symbols at symbol positions selected based on the filter index.

14. The receiver of claim 13, wherein the control unit controls the transceiver to receive, from the transmitter, an indicator indicating start of the diversity transmission mode, and to transmit, to the transmitter, a capability indicator indicating transmission modes supported by the receiver.

15. The receiver of claim 13, wherein the symbol positions are determined based on at least one of difference values, in time and frequency domains, between a symbol position from which a greatest interference occurs to a reference symbol indicated by the filter index, and the control unit controls the transceiver to receive, when no information on the filter index is stored in the transmitter, interference information configured in association with the filter index from the transmitter.

* * * * *